(12) United States Patent
Huang et al.

(10) Patent No.: US 8,536,852 B2
(45) Date of Patent: Sep. 17, 2013

(54) CURRENT BALANCE CIRCUIT TO KEEP DYNAMIC BALANCE BETWEEN CURRENTS IN POWER PASSAGES OF POWER CONNECTOR

(75) Inventors: Tsung-Sheng Huang, Taipei Hsien (TW); Chun-Jen Chen, Taipei Hsien (TW); Duen-Yi Ho, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 747 days.

(21) Appl. No.: 12/730,225

(22) Filed: Mar. 23, 2010

(65) Prior Publication Data

US 2011/0175585 A1 Jul. 21, 2011

(30) Foreign Application Priority Data

Jan. 19, 2010 (TW) .............................. 99101317 A

(51) Int. Cl.
  *G05F 3/30* (2006.01)
(52) U.S. Cl.
  USPC ............... 323/312; 323/303; 307/32; 307/52

(58) Field of Classification Search
  USPC ......... 323/223, 225, 267, 299, 303, 311–317; 307/20, 32, 33, 52, 75
  See application file for complete search history.

(56) References Cited

U.S. PATENT DOCUMENTS

| | | | | |
|---|---|---|---|---|
| 3,956,638 | A | * | 5/1976 | Ahrens et al. .................... 307/48 |
| 4,866,295 | A | * | 9/1989 | Leventis et al. .................. 307/43 |
| 6,501,255 | B2 | * | 12/2002 | Pomeroy ........................ 323/312 |
| 2010/0164452 | A1 | * | 7/2010 | Ruan et al. ..................... 323/282 |

* cited by examiner

*Primary Examiner* — Adolf Berhane
*Assistant Examiner* — Gustavo Rosario Benitez
(74) *Attorney, Agent, or Firm* — Altis Law Group, Inc.

(57) ABSTRACT

A current balance circuit includes a first and a second current sensors, an averager, a first and a second control modules, and a first and a second rheostat elements. The first and second current sensors receive a first current and a second current from a power source respectively and convert the first and second currents into a first and a second voltages. The averager receives the first and second voltages and calculates to obtain an average voltage. The first and second control modules receive the first voltage, the second voltage, and the average voltage, to obtain a first and a second control signals, to control current conduction ability of the first and second rheostat elements, to make the first and second currents keep a dynamic balance.

5 Claims, 1 Drawing Sheet

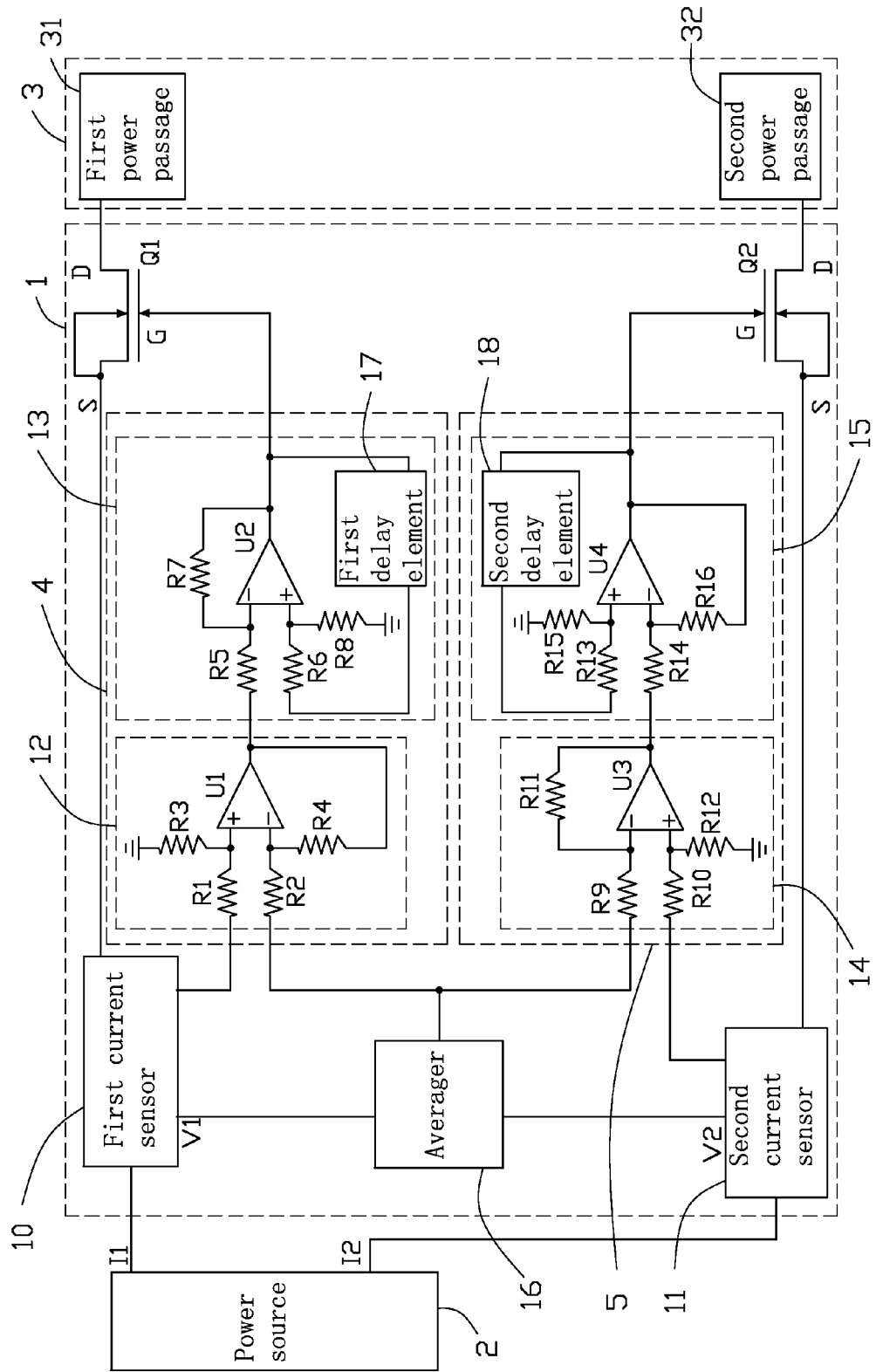

CURRENT BALANCE CIRCUIT TO KEEP DYNAMIC BALANCE BETWEEN CURRENTS IN POWER PASSAGES OF POWER CONNECTOR

BACKGROUND

1. Technical Field

The present disclosure relates to balance circuits and, particularly, to a current balance circuit.

2. Description of Related Art

In a server, some components need to be connected to a motherboard to receive currents from the motherboard. A power connector connected between the motherboard and a component has many power passages to disperse the current from the motherboard to each power passage. However, the dispersed currents passing through the power passages are unequal. There is a status that some power passages bear too high current, which leads to a service life of the corresponding component being decreased. While some other power passages bear too low current, which leads to a work efficiency of the corresponding component being decreased.

BRIEF DESCRIPTION OF THE DRAWING

The drawing is a circuit diagram of an exemplary embodiment of a current balance circuit.

DETAILED DESCRIPTION

Referring the drawing, an exemplary embodiment of a current balance circuit 1 is connected between a power source 2 and a power connector 3, to balance currents output by the power source 2 to a plurality of power passages, such as a first power passage 31 and a second power passage 32, of the power connector 3. The current balance circuit 1 includes a first current sensor 10, a second current sensor 11, a first control module 4, a second control module 5, an averager 16, a first rheostat element such as a first Metal Oxide Semiconductor Field Effect Transistor (MOSFET) Q1, and a second rheostat element such as a second MOSFET Q2.

The first control module 4 includes a first subtracter 12, a second subtracter 13, and a first delay element 17. The second control module 5 includes a third subtracter 14, a fourth subtracter 15, and a second delay element 18. The averager 16 is used to calculate an average value of signals which are input to the average 16, and output the average value. The first and second delay elements 17 and 18 are used to delay the signals which are input to the first and second delay elements 17 and 18, and output the delayed signals. The first and second MOSFETs Q1 and Q2 have current conduction ability for the currents passing through the first and second MOSFETs Q1 and Q2, and can be controlled by a voltage at gates of the first and second MOSFETs Q1 and Q2. When the voltage at the gate of each of the first and second MOSFETs Q1 and Q2 is increased, the current conduction ability of the first and second MOSFETs Q1 and Q2 is enhanced, the currents passing through the first and second MOSFETs Q1 and Q2 are increased. When the voltage at the gate of each of the first and second MOSFETs Q1 and Q2 is decreased, the current conduction ability of the first and second MOSFETs Q1 and Q2 is weaken, the currents passing through the first and second MOSFETs Q1 and Q2 are decreased.

The first current sensor 10 is connected to the power source 2 to receive a first current I1 output by the power source 2, and convert the first current I1 into a first voltage V1. The second current sensor 11 is connected to the power source 2 to receive a second current I2 output by the power source 2, and convert the second current I2 into a second voltage V2. The averager 16 is connected to the first and second current sensors 10 and 11 to receive the first and second voltages V1 and V2, and calculate an average voltage V0 of the first and second voltages V1 and V2. The averager 16 is also connected to first input terminals of the first and third subtracters 12 and 14 to output the average voltage V0 to the first input terminals of the first and third subtracters 12 and 14. A second input terminal of the first subtracter 12 is connected to the first current sensor 10 to receive the first voltage V1. An output terminal of the first subtracter 12 is connected to a first input terminal of the second subtracter 13. An output terminal of the second subtracter 13 is connected to a gate (functioning as a control terminal of the first rheostat element) of the first MOSFET Q1, to output a first control signal such as a first control voltage to control the current conduction ability of the first MOSFET Q1.

The first delay element 17 is connected between the output terminal and a second input terminal of the second subtracter 13 to delay the first control voltage output by the second subtracter 13, and output the delayed first control voltage to the second input terminal of the second subtracter 13. A drain (functioning as a first terminal of the first rheostat element) of the first MOSFET Q1 is connected to the first power passage 31. A source S (functioning as a second terminal of the first rheostat) of the first MOSFET Q1 is connected to the power source 2 via the first current sensor 10, to receive the first current I1 output by the power source 2.

A second input terminal of the third subtracter 14 is connected to the second current sensor 11 to receive the second voltage V2. An output terminal of the third subtracter 14 is connected to a first input terminal of the fourth subtracter 15. An output terminal of the fourth subtracter 15 is connected to the gate (functioning as a control terminal of the second rheostat element) of the second MOSFET Q2, to output a second control signal such as a second control voltage to control the current conduction ability of the second MOSFET Q2. The second delay element is connected between the output terminal and a second input terminal of the fourth subtracter 15, to delay the second control voltage output by the fourth subtracter 15, and output the delayed second control signal to the second input terminal of the fourth subtracter 15. The drain (functioning as a first terminal of the second rheostat element) of the second MOSFET Q2 is connected to the second power passage 32. A source S (functioning as a second terminal of the second rheostat) of the second MOSFET Q2 is connected to the power source 2 via the second current sensor 10 to receive the second current I2 output by the power source 2.

In the embodiment, the first and second current sensors 10 and 11 can convert the first and second currents I1 and I2 into the first and second voltage V1 and V2, respectively, and at the same time directly output the first and second currents I1 and I2 received from the power source 2 to the sources S of the first and second MOSFETs Q1 and Q2. In other embodiments, the sources S of the first and second MOSFETs Q1 and Q2 can be directly connected to the power source 2 to receive the corresponding first and second currents I1 and I2.

The first subtracter 12 includes an amplifier U1 and resistors R1-R4. The second subtracter 13 includes an amplifier U2 and resistors R5-R8. The third subtracter 14 includes an amplifier U3 and resistors R9-R12. The fourth subtracter 15 includes an amplifier U4 and resistors R13-R16. A non-inverting terminal of the amplifier U1 is connected to a first terminal of the resistor R1, and is grounded via the resistor R3. A second terminal of the resistor R1 functions as the second input terminal of the first subtracter 12. An inverting terminal of the amplifier U1 is connected to a first terminal of the resistor R2, and connected to an output terminal (the output terminal of the first subtracter 12) of the amplifier U1 via the resistor R4. A second terminal of the resistor R2 functions as the first input terminal of the first subtracter 12. A non-inverting terminal of the amplifier U2 is connected a first terminal of the resistor R6, and is grounded via the resistor R8. A second terminal of the resistor R6 functions as the second input terminal of the second subtracter 13. An inverting terminal of the amplifier U2 is connected to a first terminal of the resistor R5, and connected to an output terminal (the output terminal of the second subtracter 13) of the amplifier U2 via the resistor R7. A second terminal of the resistor R5 functions as the first input terminal of the second subtracter 13.

A non-inverting terminal of the amplifier U3 is connected to a first terminal of the resistor R10, and is grounded via the resistor R12. A second terminal of the resistor R10 functions as the second input terminal of the third subtracter 14. An inverting terminal of the amplifier U3 is connected to the a first terminal of the resistor R9, and connected to an output terminal (the output terminal of the third subtracter 14) of the amplifier U3 via the resistor R11. A second terminal of the resistor R9 functions as the first input terminal of the third subtracter 14. A non-inverting terminal of the amplifier U4 is connected to a first terminal of the resistor R13, and is grounded via the resistor R15. A second terminal of the resistor R13 functions as the second input terminal of the fourth subtracter 15. An inverting terminal of the amplifier U4 is connected to a first terminal of the resistor R14, and connected to an output terminal (the output terminal of the fourth subtracter 15) of the amplifier U4 via the resistor R16. A second terminal of the resistor R14 functions as the first input terminal of the fourth subtracter 15.

In the embodiment, resistances of the resistors R1-R4 are equal. Resistances of the resistors R9-R12 are equal. Resistances of the resistors R5 and R7 are equal. Resistances of the resistors R14 and R16 are equal. In other embodiments, the resistances of the resistors R1-R16 can be changed according to need. The rheostat elements Q1 and Q2 can be other elements, such as transistors.

When the power source 2 is working, the power source 2 outputs the first current I1 to the first current sensor 10, and outputs the second current I2 to the second current sensor 11. The first current sensor 10 converts the first current I1 into the first voltage V1, outputs the first voltage V1 to the averager 16 and the second input terminal of the first subtracter 12, and outputs the first current I1 to the first MOSFET Q1. The second current sensor 11 converts the second current I2 into the second voltage V2, and outputs the second voltage V2 to the averager 16 and the second input terminal of the third subtracter 14. Wherein I1/I2=V1/V2. The averager 16 calculates the average voltage V0 according to the received first and second voltages V1 and V2, namely, V0=(V1+V2)/2. The averager 16 outputs the average voltage V0 to the first input terminals of the first and third subtracters 12 and 14. The first subtracter 12 subtracts the average voltage V0 from the first voltage V1, to obtain a voltage Vout1=V1−V0. The first subtracter 12 outputs the voltage Vout1 to the first input terminal of the second subtracter 13. The second subtracter 13 subtracts the voltage Vout1 from a voltage Vk1_1 at the second input terminal of the second subtracter 13, to obtain a control voltage Vk1=P1*Vk1_1−(V1−V0), where P1=R8/(R8+R6). The voltage Vk1_1 is obtained via the first delay element 17 delaying the control voltage Vk1 output by the second subtracter 13 last time.

Similarly, the third subtracter 14 subtracts the average voltage V0 from the second voltage V2, to obtain a voltage Vout2=V2−V0. The third subtracter 14 outputs the voltage Vout2 to the first input terminal of the fourth subtracter 15. The fourth subtracter 15 subtracts the voltage Vout2 from a voltage Vk2_1 at the second input terminal of the fourth subtracter 15, to obtain a control voltage Vk2=P2*Vk2_1−(V2−V0), where P2=R15/(R15+R13). The voltage Vk2_1 is obtained via the second delay element 18 delaying the control voltage Vk2 output by the fifth subtracter 15 last time.

When the first current I1 output by the power source 2 is greater than the second current I2 output by the power source 2, the first voltage V1 output by the first current sensor 10 is greater than the second voltage V2 output by the second current sensor 11, namely, (V1−V0)>0, (V2−V0)<0. The control voltage P1*Vk1_1−(V1−V0) output by the second subtracter 13 to the gate of the first MOSFET Q1 is gradually decreased according to (V1−V0)>0. The current conduction ability of the first MOSFET Q1 is weaken. The first current I1 is decreased. The control voltage P2*Vk2_1−(V2−V0) output by the fourth subtracter 15 to the gate of the second MOSFET Q2 is gradually increased according to (V2−V0)<0. The current conduction ability of the second MOSFET Q2 is increased. The second current I2 is increased. Therefore, a difference of currents passing through the first and second power passages 31 and 32 is decreased. The first current I1 will be equal to the second current I2. When the first current I1 is equal to the second current I2, namely, I1=I2, the first voltage V1 is equal to the second voltage V2, and the average voltage V0 is equal to each of the first and the second voltages V1 and V2, namely, V0=V1=V2. The second subtracter 13 outputs the control voltage Vk1=P*Vk1_1, the fourth subtracter 15 outputs the control voltage Vk2=P*Vk1_1. Owing to the control voltage Vk1_1 is not equal to the control voltage Vk2_1, the current conduction ability of the first and second MOSFETs Q1 and Q2 are different. The first current I1 becomes unequal to the second current I2. The current balance circuit 1 adjusts the first and second currents I1 and I2 again, to make the first and second currents I1 and I2 keep a dynamic balance.

When the first current I1 output by the power source 2 is less than the second current I2 output by the power source 2, the work process of balancing the first current I1 and the second current I2 now is same to the above-mentioned balancing of the first current I1 and the second current I2 when the first current I1 is greater than the second current I2. Therefore, the work process of balancing the first current I1 and the second current I2 is not described detailed. The current balance circuit 1 decreases the current difference between the first and second currents I1 and I2 output by the power source 2, to make the first current I1 substantially equal to the second current I2, thereby keeping a current dynamic balance. In this embodiment, the absoluteness balance of the first and second currents I1 and I2 is transient.

In other embodiments, the power source 2 can correspond to a plurality of power connectors. Each of the plurality of power connectors corresponds to one current balance circuit 1. The current balance circuit 1 can includes a plurality of current sensors. Each of the plurality of current sensors corresponds to one power passage of the corresponding power connector.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A current balance circuit to keep a dynamic balance between first and second currents output by a power source to first and second power passages of a power connector, the current balance circuit comprising:

first and second current sensors connected to the power source to receive the first and second currents respectively, output the first and second currents respectively, and convert the first and second currents into a first and a second voltages respectively;

an averager connected to the first and second current sensors to receive the first and second voltages, and calculate an average voltage of the first and second voltages;

a first rheostat element connected to the first current sensor to receive the first current output by the power source;

a second rheostat element connected to the second current sensor to receive the second current output by the power source;

a first control module connected to the first current sensor and the averager to receive the first voltage and the average voltage, and calculate the first voltage and the average voltage to obtain a first control signal to control a current conduction ability of the first rheostat for the first current; and a second control module connected to the second current sensor and the averager to receive the second voltage and the average voltage, and calculate the second voltage and the average voltage to obtain a second control signal to control a current conduction ability of the second rheostat for the second current, to make the first and second currents passing through the first and second power passages keep a current dynamic balance;

wherein the first control module comprises a first subtracter, a second subtracter, and a first delay element; the second control module comprises a third subtracter, a fourth subtracter, and a second delay element; wherein a first input terminal of the first subtracter is connected to the averager to receive the average voltage, a second input terminal of the first subtracter is connected to the first current sensor to receive the first voltage, an output terminal of the first subtracter is connected to a first input terminal of the second subtracter, an output terminal of the second subtracter is connected to a control terminal of the first rheostat element and connected to a second input terminal of the second subtracter via the first delay element; wherein a first input terminal of the third subtracter is connected to the averager to receive the average voltage, a second input terminal of the third subtracter is connected to the second current sensor to receive the second voltage, an output terminal of the third subtracter is connected to a first input terminal of the fourth subtracter, a second input terminal of the fourth subtracter is connected to an output terminal of the fourth subtracter via the second delay element, the output terminal of the fourth subtracter is also connected to a control terminal of the second rheostat element; and wherein the first subtracter comprises a first amplifier and first to fourth resistors, the second subtracter comprises a second amplifier and fifth to eighth resistors, the third subtracter comprises a third amplifier and ninth to twelfth resistors, the fourth subtracter comprises a fourth amplifier and thirteenth to sixteenth resistors, a non-inverting terminal of the first amplifier is connected to a first terminal of the first resistor, and is grounded via the third resistor, a second terminal of the first resistor functions as the second input terminal of the first subtracter, an inverting terminal of the first amplifier is connected to a first terminal of the second resistor, and connected to an output terminal of the first amplifier via the fourth resistor, the output terminal of the first amplifier functions as the output terminal of the first subtracter, a second terminal of the second resistor functions as the first input terminal of the first subtracter; wherein a non-inverting terminal of the second amplifier is connected to a first terminal of the sixth resistor, and is grounded via the eighth resistor, a second terminal of the sixth resistor functions as the second input terminal of the second subtracter, an inverting terminal of the second amplifier is connected to a first terminal of the fifth resistor, and connected to an output terminal of the second amplifier via the seventh resistor, the output terminal of the second amplifier functions as the output terminal of the second subtracter, a second terminal of the fifth resistor functions as the first input terminal of the second subtracter; wherein a non-inverting terminal of the third amplifier is connected to a first terminal of the tenth resistor, and is grounded via the twelfth resistor, a second terminal of the tenth resistor functions as the second input terminal of the third subtracter, an inverting terminal of the third amplifier is connected to a first terminal of the ninth resistor, and connected to an output terminal of the third amplifier via the eleventh resistor, an output terminal of the third amplifier functions as the output terminal of the third subtracter, a second terminal of the ninth resistor functions as the first input terminal of the third subtracter; wherein a non-inverting terminal of the fourth amplifier is connected to a first terminal of the thirteenth resistor, and is grounded via the fifteenth resistor, a second terminal of the thirteenth resistor functions as the second input terminal of the fourth subtracter, an inverting terminal of the fourth amplifier is connected to a first terminal of the fourteenth resistor, and connected to an output terminal of the fourth amplifier via the sixteenth resistor, the output terminal of the fourth amplifier functions as the output terminal of the fourth subtracter, a second terminal of the fourteenth resistor functions as the first input terminal of the fourth subtracter.

2. The current balance circuit of claim 1, wherein each of the first and second rheostat elements further comprises a first terminal and a second terminal, the first terminal of the first rheostat element is connected to the first power passage, the second terminal of the first rheostat element is connected to the first current sensor, the first terminal of the second rheostat element is connected to the second power passage, the second terminal of the second rheostat element is connected to the second current sensor.

3. The current balance circuit of claim 2, wherein the first and second rheostat elements are Metal Oxide Semiconductor Field Effect Transistors (MOSFETs), a gate of each MOSFET is the control terminal of a corresponding one of the first and second rheostat elements, a drain of each MOSFET is the first terminal of the corresponding one of the first and second rheostat elements, a source of each MOSFET is the second terminal of the corresponding one of the first and second rheostat elements.

4. The current balance circuit of claim 1, wherein each of the first and second rheostat elements further comprises a first terminal and a second terminal, the first terminal of the first rheostat element is connected to the first power passage, the second terminal of the first rheostat element is connected to the power source, the first terminal of the second rheostat element is connected to the second power passage, the second terminal of the second rheostat element is connected to the power source.

5. The current balance circuit of claim 1, wherein resistances of the first to fourth resistors are equal, resistances of the ninth to twelfth resistors are equal, resistances of the fifth and seventh resistors are equal, resistances of the fourteenth to sixteenth resistors are equal.

\* \* \* \* \*